United States Patent [19]

Tredinnick et al.

[11] 3,715,842
[45] Feb. 13, 1973

[54] SILICA POLISHING COMPOSITIONS HAVING A REDUCED TENDENCY TO SCRATCH SILICON AND GERMANIUM SURFACES

[75] Inventors: Bruce Charles Tredinnick, Flemington, N.J.; James Richard Gambale, Media, Pa.; Paul Montgomery Dupree, Delaware Township, Hunterdon County, N.J.

[73] Assignee: Tizon Chemical Corporation, Flemington, N.J.

[22] Filed: July 2, 1970

[21] Appl. No.: 52,094

[52] U.S. Cl. ........................51/281, 51/303, 51/308
[51] Int. Cl. ........................B24b 1/00, C08h 17/12
[58] Field of Search........51/295, 303, 297, 308, 281, 51/284, 317, 292; 106/5, 193

[56] References Cited

UNITED STATES PATENTS

| | | | |
|---|---|---|---|
| 2,833,661 | 5/1958 | Iler | 106/193 |
| 3,053,646 | 9/1962 | Roth | 51/298 |
| 2,250,667 | 7/1941 | Hall | 106/5 |
| 3,429,080 | 2/1969 | Lachapelle | 51/307 |
| 3,328,141 | 6/1967 | Lachapelle | 51/307 |
| 3,024,145 | 3/1962 | Nickerson | 106/193 |
| 2,322,179 | 6/1943 | Zwet | 106/193 |

*Primary Examiner*—Donald J. Arnold
*Attorney*—Janes and Chapman

[57] ABSTRACT

Alkaline aqueous silica polishing compositions are provided, having a reduced tendency to scratch silicon and germanium surfaces, such as single crystal wafers polished for use in semiconductors. The polishing compositions comprise silica as the polishing agent, and a water-soluble cellulose ether, and are used with water.

11 Claims, No Drawings

SILICA POLISHING COMPOSITIONS HAVING A REDUCED TENDENCY TO SCRATCH SILICON AND GERMANIUM SURFACES

Silicon monocrystals and to some extent germanium monocrystals are now widely used as semiconductors in the manufacture of transistors and like equipment. The silicon or germanium crystal is prepared in ingot form. The ingots are usually rather large, of the order of one-half inch to 6 inches in diameter and 2 inches to 2 feet long. The silicon or germanium is sliced from the ingot in very thin sheets or wafers, having thicknesses of only 0.005 to 0.030 of an inch, and these sheets or wafers are then polished to produce as planar a surface as possible. It is important that the surface be absolutely planar, and free from scratches, pits and like defects.

The polishing compositions generally used for this purpose comprise a polishing agent such as cerium oxide, aluminum oxide, red rouge (ferric oxide), white rouge (silica) or zirconium oxide, slurried in water. The polish is applied to the silicon or germanium surface, and the polishing effected with a polishing pad. It is sometimes desirable to remove most of the surface defects fast with one polishing agent, and then polish the surface to a fine finish with another. Precipitated silica is particularly useful as a finishing polish agent. However, silica slurries have an unpredictable tendency to produce scratches, which can be rather deep.

Precipitated silicas are known and when in the form of silica slurries have a tendency to scratch the surface being polished. The age of the silica slurry has a definite effect on the scratching tendency, an aged slurry having a much greater tendency to produce scratches than a freshly prepared one. This means, of course, that the manufacturer of polished silicon or germanium crystals cannot afford to use available silica slurries, but must form his own slurries from silica particles. It also means that it is not possible to use silica polishing slurries for more than one week. The slurries generally are freshly prepared each day, and the old slurries discarded. This is a particularly irksome problem, since silica is a good polishing agent for silicon and germanium, capable especially when used as a finishing agent of producing a brilliant haze-free textureless surface, free from the usual surface defects, and in addition is one of the least expensive polishing agents.

In accordance with the invention, it has been determined that a silica slurry thickened sufficiently with a water-soluble cellulose derivative to inhibit settling of the silica does not even twelve weeks after its preparation cause scratching of silicon and germanium surfaces, and can thus overcome this problem of storage stability. The cellulose derivative in certain amounts also reduces the amount of silicon or germanium removed without deleteriously affecting the quality of the polished surface, making the composition especially advantageous as a finishing composition, after surface defects or blemishes have been removed by another more rapid polishing composition. The silica slurries of the invention thickened with water-soluble cellulose derivative in an amount to thicken the composition sufficiently to inhibit deposition of silica when the composition is dispersed in water prevent the development of a scratching tendency even after the aqueous slurry has been aged for as much as 12 weeks.

In the process of the invention, the polishing of silicon and germanium is carried out with an aqueous slurry of a silica polishing agent in the presence of a water-soluble cellulose derivative, so as to produce a planar surface substantially free from polishing defects, such as pits and scratches, even after the aqueous slurry has been aged for at least 6 weeks.

The invention is applicable to the polishing of any silicon or germanium surface, but is especially adapted for the polishing of crystalline silicon and crystalline germanium and silicon and germanium monocrystals.

The invention is of particular application to silica slurries in which silica is the polishing agent. However, other polishing agents useful in the polishing of silicon and germanium can be employed in the polishing compositions of the invention, either in addition to or instead of silica. The water-soluble cellulose derivative will also inhibit the development of a scratching tendency due to these polishing agents, and improve the quality of the surface obtained. Additional polishing agents accordingly can be zirconium oxide, cerium oxide, tin oxide, titanium oxide, zirconium silicate, nickel oxide, alkali and alkaline earth metal and aluminum silicates, ammonium, aluminum oxide, and ferric oxide or red rouge. Commercial grades of these materials containing minor amounts of other oxides as impurities can also be used, such as the commercial grades of cerium oxide containing cerium oxide in admixture with other rare earth oxides, such as thorium oxide, for example, Barnesite and Rareox. The polishing agent is preferably finely-divided, and has a particle size of less than 30 microns, and an average particle size of less than 1 micron, preferably less than 100 m$\mu$.

Precipitated silica is a preferred polishing agent because it gives a superior surface which is completely haze-free, brilliant, textureless and free from surface defects. The silica is preferably finely-divided, and has a particle size of less than 100 m$\mu$.

A particularly preferred type of precipitated silica is substantially free from silica gel, and is composed of hydrated precipitated finely-divided silica particles prepared by mixing together an aqueous sodium silicate solution, a clustering agent, and an insolubilizing agent, under prescribed conditions, so as to produce extremely finely-divided silica. The product and the method for its preparation are described in U.S. Pat. No. 3,208,823, patented Sept. 28, 1965, to Baker and Austin.

It is also preferred, although not essential, that the polishing slurries in accordance with the invention have a pH of at least about 7, and preferably at least about 10, since a better quality planar surface is produced. Consequently, there is preferably combined with the polishing slurry an alkaline compound in an amount to ensure a pH of at least about 7 in the presence of water. The upper limit on the pH is established by the solubility of the polishing agent in the alkali. Usually, the upper pH limit that is obtainable is about 12.5, but theoretically it can be as high as 14. However, pH values within the range from about 10 to about 12 are preferred, for optimum surface quality characteristics.

The silicas available in commerce are essentially neutral compositions, and it is necessary to incorporate only a very small amount of alkaline compound to ensure a pH within this range. In fact, the use of excessive amounts of alkaline compound, well beyond that required to maintain a pH from 7 to 12.5, tends to soften the silicon or germanium surface during polishing to such an extent as to impair the quality of the surface.

The amount of alkaline compound to achieve a given alkalinity will, of course, be dependent on the basicity of the compound, and upon the polishing agent. Some are more effective at very high alkalinities than others. As an illustration, in the case of silica slurries, the amount of alkaline compound in the case of strong alkalis such as sodium hydroxide, potassium hydroxide, calcium hydroxide, barium hydroxide, ammonium hydroxide or lithium hydroxide, or strongly alkaline salts such as sodium carbonate, potassium carbonate and lithium carbonate, is above about 0.05 percent, but usually not in excess of about 100 percent by weight of the polishing agent. There is, however, no critical upper limit. The upper limit frequently can be as high as 1,000 percent, without disadvantage. A practical polishing effectiveness is obtained employing an amount within the range from about 0.05 to about 50 percent, beyond which an increase in polishing effectiveness may not always be commensurate with the larger amounts of alkaline compounds required, and hence not economical. Consequently, amounts within this range are preferred.

As the alkaline compound, any compound sufficiently alkaline to ensure a pH in excess of about 7 can be used. The oxides and hydroxides of the alkali and alkaline earth metals are available and inexpensive, and are preferred. These include, in addition to those named above, calcium oxide, barium oxide, strontium oxide, magnesium oxide, magnesium hydroxide, and strontium hydroxide. Other strong metal hydroxides can be used, such as aluminum hydroxide. Strongly alkaline salts of the alkali and alkaline earth metals also can be used, including the carbonates, metaborates, tetraborates, triphosphates, pyrophosphates and tripolyphosphates, for example, in addition to those named above, sodium metaborate, trisodium orthophosphate, pentasodium tripolyphosphate, tetrasodium pyrophosphate, potassium metaphosphate, sodium tetraborate pentahydrate, sodium tetraborate decahydrate, sodium penta-borate, barium orthophosphate and lithium orthophosphate.

The polishing compositions of the invention also include a water-soluble cellulose derivative, including ethers and esters, preferably one which is stable in high alkaline solutions of pH 8.5 or above. Suitable water-soluble cellulose derivatives include methyl cellulose, methyl ethyl cellulose, methyl hydroxypropyl cellulose, methyl hydroxyethyl cellulose, ethyl cellulose, hydroxyethyl cellulose, hydroxypropyl cellulose, ethyl hydroxyethyl cellulose, water-soluble salts of cellulose ether carboxylic acids, such as sodium carboxymethyl cellulose, cyanoethyl cellulose, sulfoethyl cellulose, and sodium salts of cellulose sulfuric acid esters. Such water-soluble cellulose derivatives and methods of their preparation are well known in the art, and many of these are also commercially available.

The amount of cellulose derivative added to the polishing composition is sufficient, when the composition is slurried in water, to increase the viscosity and inhibit settling of the polishing agent on standing. For some reason which is not understood, if the silica settles out and is allowed to stand in this condition, it develops the tendency to scratch the silicon or germanium surface. It is possible that the scratching tendency is thus associated with agglomeration of the silica particles. In any case, if settling is inhibited by the addition of the cellulose derivative thickening agent, the tendency to scratch is overcome, and this is also true of other polishing agents that develop or have such a tendency.

Usually, a very small amount of the water-soluble cellulose derivative is sufficient to inhibit settling of the silica. An amount of as little as 0.05 percent by weight of the water present in the slurry will suffice in most cases. Amounts within the range from about 0.25 to about 1.5 percent are preferred. An amount of as little as 0.5 percent by weight of the polishing agent and preferably from about 2.5 to about 30 percent by weight of the polishing agent is used in a solid composition for dispersion in water. There is no upper limit on the amount of thickening agent, except that if the slurry is unduly viscous, the polishing time may be increased. Consequently, amounts in excess of about 2.5 percent cellulose derivative by weight of the water and 60 percent by weight of the polishing agent are not employed in most cases.

A slowing of the removal rate of silicon or germanium, to obtain virtually no removal and confine polishing to a finishing action, is associated with even small amounts of the cellulose derivative. If the composition should have a removal rate of silicon or germanium, instead of just a finishing action, it should contain a very small amount of cellulose ether.

There is no lower limit on the amount of the cellulose ether except as is imposed by the settling tendency of the polishing agent and this is to some extent determined by the particle size of the polishing agent and the type of the polishing agent, since some types of polishing agents have a greater tendency to settle than others. However, by trial and error it is quite easy to determine the amount of cellulose derivative required to inhibit settling and thus inhibit the tendency of the polishing agent to develop scratching on aging, and to obtain removal of silicon or germanium or no removal of silicon or germanium, as desired.

The compositions of the invention can be formulated as solid mixtures or blends, the polishing agent and water-soluble cellulose derivative (and alkaline compound, if any is present) being mixed or ground together to form a homogeneous mixture or blend. The polishing agent should be in finely-divided form, not in excess of about 10 microns in size. Since the water-soluble cellulose derivative and the alkaline compound are normally dissolved in the water used to slurry the composition, the particle size of these is not critical, but, of course, a particle that is rapidly dissolving in water is desirable.

The compositions can also be formulated as aqueous slurries, and sold as such. Such slurries for convenience in handling prior to use should be as concentrated as possible, containing 5 percent to 90 percent solids.

The user of the composition will add water to a solid composition, or may dilute a concentrated aqueous slurry, to produce a polishing slurry of the desired concentration and consistency, containing usually of the order of from about 1 to about 50 percent polishing agent by weight of the slurry. The amount of cellulose derivative is thus determined as that required in a 1 to 50 percent slurry of the polishing agent to produce the desired thickening effect.

The polishing or finishing is carried out in the conventional way at room temperature, by applying the aqueous slurry polishing composition to the silicon or germanium surface, and then polishing with a polishing pad. The so-called commercial bowl feed polishers and other commercially used or modified polishing or lapping machines are useful.

The polishing compositions in accordance with the invention are especially useful as a final surface finishing material for single crystal silicon or germanium wafers used as semiconductors after a preliminary polishing action has been carried out using a conventional polishing agent, such as the monoclinic or cubic forms of zirconium oxide, aluminum oxide, cerium oxide or red rouge. The initial polishing work is done by the conventional polishing agent, and the polishing slurries of the invention, especially those containing silica, then serve to produce a brilliant haze-free textureless surface, free of scratches, pits, orange peel or other surface contamination.

The following Examples in the opinion of the inventors represent preferred embodiments of this invention.

A standardized polishing test was used to evaluate the polishing effectiveness on silicon wafers of the polishing slurries used as a final surface finishing material. This test was carried out as follows.

First, the silicon wafers were mounted on a support, and then polished with an aqueous zirconium oxide polishing slurry to remove approximately 1 mil thickness of material. This takes about fifteen minutes on a Corfam pad, at 3 to 5 psi. pressure, applied through the pad to the surface of the silicon, on a polishing machine with a polishing platen rotary-driven at 50 to 150 rpm. After completion of the initial polishing, the block with the wafers still mounted was rinsed with water, and then placed on another machine, with a clean Corfam pad, and then polished for fifteen minutes using the test slurry under the same conditions.

EXAMPLE 1

Quso G–32 silica, $SiO_2$, a microfine precipitated silica manufactured under U.S. Pat. No. 3,208,823, particle size 10 to 20 m$\mu$, average 13 m$\mu$, pH 8.5, surface area 300 sq. m/g., bulk density 4 lbs./cu ft., was added to water and stirred to form a uniformly dispersed 9 percent slurry, whose pH was then adjusted to 10.1 by the addition of ammonia. A second 9 percent slurry was prepared in the same way, adding 1.5 percent Methocel HG 65, water-soluble methyl cellulose, as a thickening agent.

A portion of each slurry was placed in a 600 ml. beaker, and the height of the total slurry was measured. The two slurries were then allowed to stand, and the height of the settled solids measured after various periods of time, and reported as the percent of the original height.

In addition, standardized polishing tests were run on silicon wafers, using these slurries fresh and after aging for 1, 6 and 12 weeks, respectively, to determine the development of any tendency to scratch. The following results were obtained:

TABLE I

Control Slurry (no methyl cellulose)

| Age (Weeks) | Settling % of Original Height | Silicon Scratching |
|---|---|---|
| Fresh | 100 | none |
| 1 | 36 | none |
| 6 | 30 | yes |
| 12 | 25 | yes |

EXAMPLE 1 (WITH METHYL CELLULOSE)

| Age (Weeks) | Settling % of Original Height | Silicon Scratching |
|---|---|---|
| Fresh | 100 | none |
| 1 | 100 | none |
| 6 | 100 | none |
| 12 | 95 | none |

It is evident from Example 1 that the methyl cellulose virtually eliminates settling for 6 weeks of storage, and that the settling tendency is still small after 12 weeks of storage. In no case was there any scratching of the silicon, and the polishing effect was limited to a surface treatment.

The above experiments were repeated, using 0.4 percent methyl cellulose. Settling occurred, but the settled material was soft and readily redispersed, and no scratching developed.

The contrary was true in the control, when the cellulose derivative was omitted. While the slurry was fresh, good results were obtained. After one week, there was substantial settling, but a scratching tendency had not developed. The scratching tendency was quite evident after six weeks of storage.

Thus, the methyl cellulose overcame the scratching tendency after 6 to 12 weeks of storage.

EXAMPLE 2

Quso G–32 was added to water and stirred to form a uniformly dispersed 5% slurry, whose pH was then adjusted to 10.1 by the addition of ammonia. Four additional 5 percent slurries were prepared in the same way, adding 0.3, 0.6, 0.9 and 1.2 percent Natrosol 250 MR, a water soluble ethyl cellulose, as a thickening agent.

A portion of each slurry was placed in a 600 ml. beaker and the height of the total slurry was measured. The five slurries were then allowed to stand and the height of settled solids measured after a period of 12 weeks, and reported as the percent settling.

In addition, standardized polishing tests were run on silicon wafers using the twelve week aged materials to determine the development of any tendency to scratch. The following results were obtained.

TABLE II

| % Natrosol | Age (Weeks) | Settling % | Silicon Scratching |
|---|---|---|---|
| 0.0 | 12 | 43 | yes |
| 0.3 | 12 | 25 | none |

| | | | |
|---|---|---|---|
| 0.6 | 12 | 24 | none |
| 0.9 | 12 | 22 | none |
| 1.2 | 12 | 0 | none |

Having regard to the foregoing disclosure, the following is claimed as the inventive and patentable embodiments thereof:

1. A process for polishing silicon and germanium to produce a planar surface substantially free from polishing defects, comprising applying to the surface an aqueous slurry of a polishing agent for silicon or germanium selected from the group consisting of silicon dioxide, zirconium oxide, cerium oxide, tin oxide, titanium oxide, zirconium silicate, nickel oxide, alkali and alkaline earth metal, ammonium, and aluminum silicates, aluminum oxide, and ferric oxide, alone or admixed with silica, and having a particle size of less than 10 microns, and polishing the surface in the presence of a water-soluble cellulose derivative in an amount within the range from about 0.05 to about 60 percent by weight of the polishing agent.

2. A process according to claim 1 applied to crystalline silicon or crystalline germanium, or silicon or germanium monocrystals.

3. A process according to claim 1 carried out at room temperature, by applying the aqueous slurry polishing composition to the silicon or germanium surface, and then polishing with a polishing pad.

4. A process according to claim 1 in which the polishing composition is used as a final surface finishing material after a preliminary polishing has been carried out using a conventional polishing agent for silicon or germanium, and selected from the group consisting of the monoclinic and cubic forms of zirconium oxide, cerium oxide, tin oxide, titanium oxide, zirconium silicate, nickel oxide, alkali and alkaline earth metal, ammonium, and aluminum silicates, aluminum oxide, diamond, silicon oxide, and ferric oxide.

5. A process according to claim 1, in which the polishing agent is silica.

6. A process in accordance with claim 1, in which the polishing agent is silica having an average particle size of less than 100 m$\mu$.

7. A process in accordance with claim 6, in which the silica is composed of hydrated precipitated finely-divided silica particles prepared by mixing together an aqueous sodium silicate solution, a clustering agent, and an insolubilizing agent.

8. A process in accordance with claim 1, comprising an alkaline compound in an amount to ensure a pH of at least about 7 in the presence of water.

9. A process in accordance with claim 8, in which the amount of alkaline compound is above about 0.05 percent but not in excess of about 100 percent by weight of the polishing agent.

10. A process in accordance with claim 1, in which the water-soluble cellulose derivative is methyl cellulose.

11. A process in accordance with claim 1, in which the water-soluble cellulose derivative is in an amount sufficient to provide from about 0.05 to about 2.5 percent by weight of the water present in the slurry in which the composition is dispersed.

* * * * *